Feb. 28, 1928.
O. RODHE
1,661,049
GAS ANALYSIS RECORDER
Original Filed Nov. 29, 1922   2 Sheets-Sheet 1
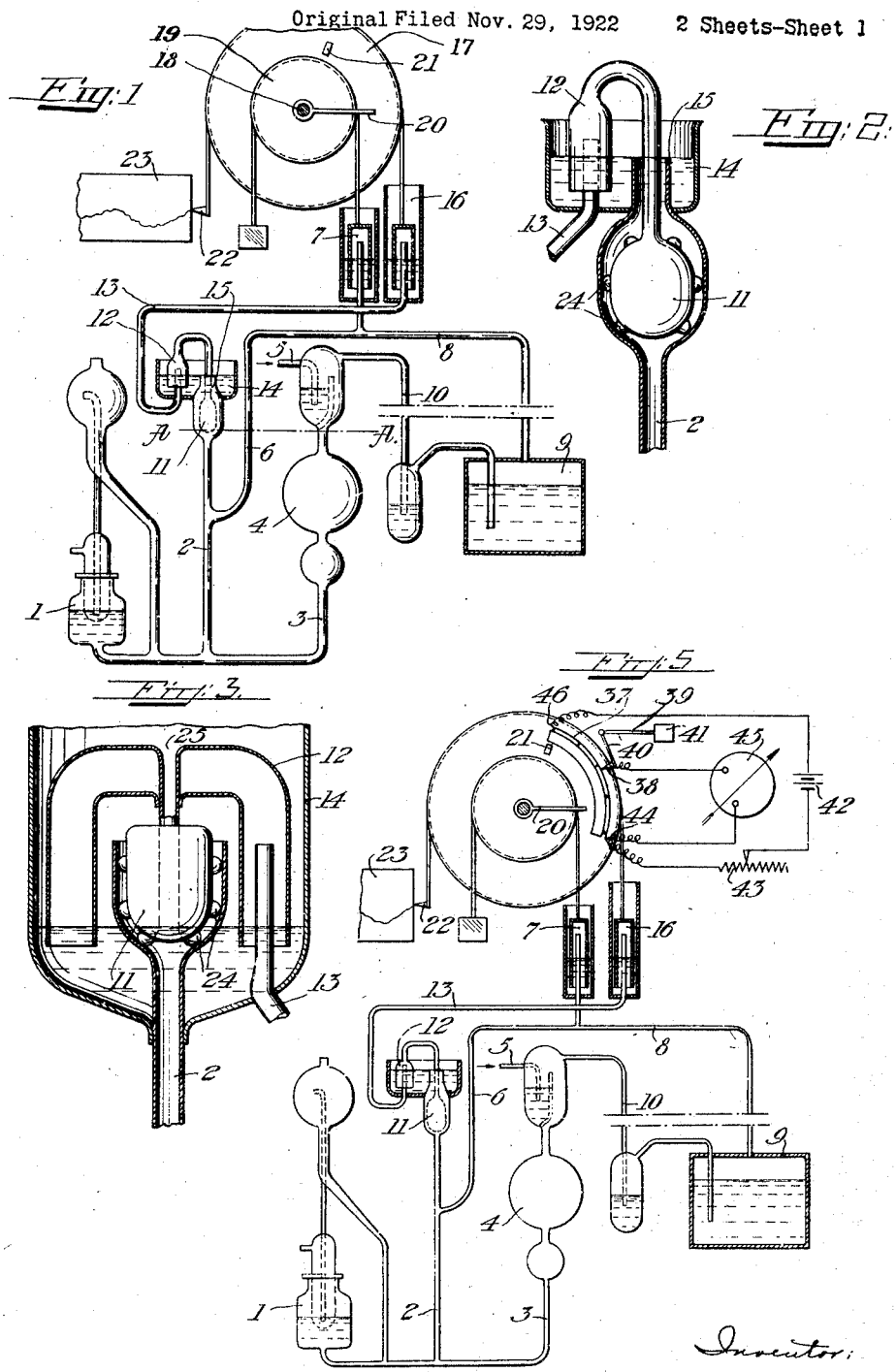

Feb. 28, 1928.
O. RODHE
1,661,049
GAS ANALYSIS RECORDER
Original Filed Nov. 29, 1922   2 Sheets-Sheet 2
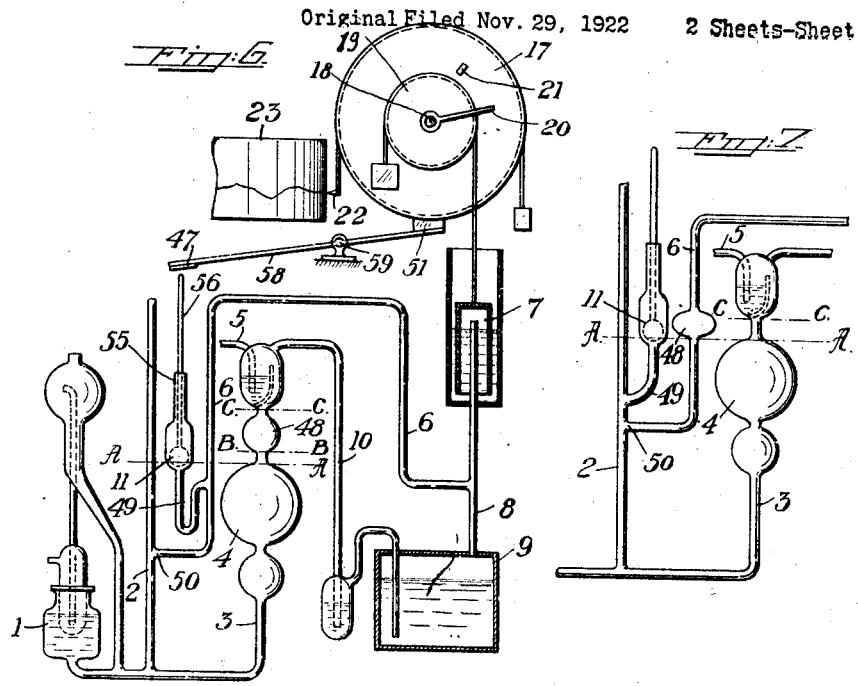

Patented Feb. 28, 1928.

1,661,049

UNITED STATES PATENT OFFICE.

OLOF RODHE, OF STOCKHOLM, SWEDEN, ASSIGNOR TO SVENSKA AKTIEBOLAGET MONO, OF STOCKHOLM, SWEDEN, A CORPORATION.

GAS-ANALYSIS RECORDER.

Application filed November 29, 1922, Serial No. 604,056, and in Sweden December 6, 1921. Renewed January 14, 1928.

In gas analyzing apparatuses comprising a primary and a secondary measuring vessel and a recording mechanism, the result of the analysis in case of the recording mechanism being of the indicating type should be read off at the very instant when the analysis is completed, or, in case the recording mechanism is of the recording type, that is, in case of the result of the analysis being recorded on a chart, the record will consist of several lines lying close to one another and extending from one and the same base line, the other ends of which indicate the proportion of the gas in the gas mixture, the percentage of which is to be determined.

It is of course of a great advantage to be able to read off the result of the analysis independently of the progress of the analysis by so constructing the apparatus, that either the recording mechanism will indicate the result of the analysis continually, or the result is recorded on the chart of the recording mechanism as a continuous curve, this result having been attained by locking the members determining the movement of the pointer or the stylus while the analysis is going on, in such a manner, that said members would continually occupy the positions corresponding to the proportion of the gas to be analyzed of the gas mixture analyzed next before.

A locking device of the type above described has been previously proposed, said device, however, being so constructed, that the members in question would not be released before the analysis was completed, that is when the whole of the gas had passed through the absorbing liquid. As the pressure liquid in the apparatus, which ordinarily consists of mercury, sinks very rapidly on having reached its turning point, the locking device has not sufficient time to release the pointer or the stylus early enough to cause a correct indication or record. It is very important that the period during which the pointer or the stylus is unlocked, is not so long that the measuring bell determining the position of the stylus during this period is again released, for if such be the case the pointer or the stylus will indicate a false result and the stylus will draw lines, more or less extended, instead of a curve. The longer, however, the period between the release of the stylus and the beginning of the sinking movement of the measuring bell, the greater is the security that the stylus or the pointer will record or indicate the correct percentage and that the stylus or the pointer has time enough to move from one position to another.

According to the present invention, a correct and exact result of analysis is obtained by the members determining the position of the stylus or the pointer being locked normally and not released before the last part of the analysis or the period of absorption or the very moment is reached when the analysis is completed. The locking of the said members may be effected by a valve or the like or by mechanical means. According to one embodiment of the invention, the said members are released from their locked positions by the ascending pump liquid in the apparatus or by the rising pressure. In this case the members determining the position of the stylus or the pointer are preferably operated by being movably connected to the secondary measuring vessel of the apparatus in such a manner, that said vessel operates in the ordinary way without affecting said members during the analysis. Not before the measuring vessel or bell has been moved into its end position at the termination of the analysis or before it is near the said position will the members be released, and then the stylus or the pointer will move into another position corresponding to the percentage of the gas to be analyzed. Thus it will be attained not only that the recording mechanism indicates continually the result of the analysis, but also that the stylus need not return after each analysis to a certain position of rest, from which position it starts during the following analysis.

The accompanying drawings illustrate a few embodiments of the present invention. Fig. 1 is a diagrammatic representation of a gas analyzing apparatus provided with a locking device according to the invention, said locking device being operated indirectly by an ascending column of liquid. Fig. 2 is a view of the locking device on a larger scale. Fig. 3 is a view of a modification thereof. Fig. 4 is a view of another embodiment of the locking device. Fig. 5 is a diagrammatic view of a gas analyzing apparatus provided with a locking device according to Figs. 1 and 2, and with an electrical recording or indicating device. Fig. 6 is a diagrammatic view of a gas analyzing apparatus provided with a mechanical locking device according to the invention. Fig. 7 is a view of a modification thereof. Fig. 8 is a diagrammatic view of a gas analyzing apparatus provided with a locking device according to the invention, said locking device being actuated by the rising pressure in the apparatus.

Referring to Fig. 1, 1 is a pump causing a body of liquid such as mercury to rise and sink alternately in the pipes 2 and 3, in a manner well known. The last mentioned pipe 3 communicates with a primary measuring vessel 4, the gas to be analyzed being sucked into said vessel through the pipe 5 during the sinking of the pump liquid therein. Extending from the pipe 2 at a suitable level thereof is a branch pipe 6 to a measuring bell 7 which is connected in known manned to an absorbing vessel 9 by means of the pipe 8. Said vessel 9 communicates in known manner with the measuring vessel 4 by means of the pipe 10. The locking device comprises a float 11 rigidly connected to a bell 12 turned over the mouth of a pipe 13. The float 11 is arranged in an enlarged portion of the pipe 2, said pipe and the pipe 13 extending to a certain level into a basin 14 which is filled by mercury or other sealing liquid up to the upper mouth 15 of the pipe 2. Pipe 13 extends above the surface of the mercury into said bell 12. Pipe 2 serving in this manner as an over-flow pipe, a constant level will be maintained in the basin 14.

The pipe 13 communicates with an air bell 16 or the like suitably connected with a wheel 17 which is rotatably mounted on a shaft 18. Secured to the said shaft 18 is a further wheel 19, connected in known manner with the measuring bell 7. Wheel 17 is provided with a stop 20, and the other wheel with a projection 21 lying in the path of movement of the stop 20. Connected with the rotatably mounted wheel 17 is a stylus 22 or the like which records the results of the analysis on the chart 23.

The mode of operation is as follows:

During the suction stroke of the pump, when the liquid descends in the pipe 2 and the measuring vessel 4, a given volume of the gas to be analyzed is sucked in known manner into said vessel 4. While this is taking place, the locking bell 16 is locked by the liquid seal 12, the float 11 being in the position shown in Fig. 1. During the following compression stroke of the pump, the gas is pressed through the conduit 10 into the absorbing vessel 9, and from said vessel the part of the gas not absorbed is pressed into the measuring bell 7 through the pipe 8. On the pump liquid having reached the level A—A at or near the termination of the analysis, such liquid raises the float 11 and the bell 12 so that the sealing bell 16 will be brought into communication with the atmosphere through the pipe 13, said bell being thereby released from its locked position. The gas pressed from the absorbing vessel 9 into the measuring bell 7 has raised said bell in the meantime, thereby causing rotation of the wheel 19.

When during the progress of the analysis the wheel 19 is rotated, it may evidently occur at the termination of the analysis, that the wheel 19 has been rotated either through so small an angle, that the stop 20 has not reached the abutment 21 but has stopped at some distance therefrom, or through such an angle, that the stop 20 has reached the abutment. In the former case the operation is as follows:

At or near the stopping moment of the wheel 19, the mouth of the pipe 13 will be uncovered by the pump liquid rising around the float and by the float being elevated together with the bell 12, the sealing bell 16 being thus brought into communication with the atmosphere. By this the sealing bell 16 will sink and bring the wheel 17 along with it. However, as soon as the abutment 21 reaches the stop 20 the wheel 17 will stop, this movement resulting in the stylus 22 being moved a distance upwards on the chart 23.

The operation just described obviously corresponds to cases where a greater quantity of gas is absorbed during this analysis than during the next preceding one. It is evident, that then a smaller quantity of gas will remain to be introduced into the measuring bell 7 than the one left from the preceding analysis and introduced into the said bell.

When conditions are reversed, that is to say, if in a given analysis a smaller quantity of gas is absorbed and thus a greater quantity will be left to be introduced into the measuring bell 7 than in the nearest preceding analysis, the mode of operation will instead be as follows:

Toward the termination of the analysis the stop 20 will reach the abutment 21 and will tend, during its further movement, to bring said projection along with it and, consequently, rotate the wheel 17, thus causing the stylus to move downwards on the chart 23. However, it may simultaneously occur, in the case of the difference between two consecutive analyses being great, that the locking device, 11, 12 will continually seal the mouth of the pipe 13 and, consequently, also the sealing bell, so that the said recording movement cannot be produced at once, whereas the following course of movements will occur.

The stop 20 presses against the abutment 21, while an increased pressure will occur in the measuring bell 7 and the piping connected thereto. It is evident, that this increased pressure causes a slight movement of the wheels 19 and 17. However, this movement can occur only by a partial vacuum being produced in the sealing bell 16 and in the piping system pertaining thereto. The pump liquid, however, continues its ascending movement in the pipe 2 and in the primary measuring vessel 4 at a continued increase of the pressure of the measuring bell 7 and the vacuum of the sealing bell 16. At last the sealing effect of the locking device 11, 12 will cease, the pipe 13 will be connected with the atmosphere and the vacuum in the bell 16 will cease. The resistance of the sealing bell 16 against the movement of the wheel 17 having now ceased, the pressure of the measuring bell 7 will immediately cause a further rotation of the wheel 19 into a position corresponding to the result of the analysis, the wheel 17 being brought along into the corresponding end position.

When, on the termination of the analysis, the pump liquid sinks, the measuring bell 7 will also sink as soon as said bell has been brought into communication with the atmosphere through the branch pipe 6, the rising pipe 2, the float chamber and the opening 15, bringing with it the wheel 19 into the zero position of said wheel. However, as soon as the pump liquid has sunk below the level A—A, the locking device 11, 12 will lock the sealing bell 16, which in turn will lock the wheel 17 which, consequently, does not partake in the return movement of the wheel 19, but will remain in its set position until or nearly until the termination of the next analysis, when the operations described above will be repeated.

In Fig. 2, the locking device above described is shown on a larger scale. The float 11 is provided on the outside with projections 24 or the like, partly to prevent its fastening in the enlarged portion of the pipe 2, and partly to prevent the float from acting as a sealing valve or the like.

The modification of the locking device shown in Fig. 3 differs from that shown in Figs. 1 and 2 by the bell 12 being formed concentrically with the float 11, thus producing a better guiding effect. Moreover, the float is provided with a channel 25 to let out the air in the measuring bell 7, when the locking device assumes an inoperative position and the pump liquid has sunk so far that the connection of the branch pipe 6 with the rising pipe 2 is uncovered.

Fig. 4 shows a further embodiment of the locking device, comprising an upper closed cylinder 26 provided at its bottom with a conical valve 27 controlling the connection between said cylinder and a lower cylinder 28 connected with the ascending pipe 2. Guided in said lower cylinder is a float or piston 29 which does not fit tightly to the walls of the cylinder. The float 29 is suspended in a spring 30 attached to an annular projection 31 projecting inwardly from the wall of the cylinder and coiled around a spindle 32 attached to the float 29. The valve 27 is pressed down into closed position by a spring 33 coiled around the valve spindle 34 and attached to the top wall of the upper cylinder. Further, the valve 27 is provided with a stop 35 adapted to co-act with the spindle 32. The pipe 13 leading to the sealing bell 16 opens into the upper cylinder, and the lower cylinder 28 communicates with the atmosphere through the pipe 36.

When the pressure rises at the termination of the analysis, the float 29 is lifted, causing the spindle 32 to abut against the stop 35 of the valve 27, whereby this valve opens and causes the pipe 13 and consequently also the sealing bell 16 to be brought into communication with the atmosphere through the pipe 36. When the pressure then sinks, the float 29 will sink too, causing the valve 27 to be pressed against its seat by the spring 33, thus effecting the sealing of the bell 16. When the connection between the branch pipe 6 and the ascending pipe 2 is attained during the last portion of the suction stroke by the pump liquid falling below the mouth of the pipe 6, the gas will flow from the measuring bell 7 between the float and the wall of the cylinder into the open air through the pipe 36.

Fig. 5 shows diagrammatically a gas analyzing apparatus provided with a locking device according to the invention, said apparatus being provided with electrical recording means. 37 designates a metal wire, stretched along a circular arc on the wheel 17. Bearing on said wire is a contact piece 38 attached to the end of the one arm of a bell crank lever 40 rotatably mounted on a fixed pin 39, the other arm of said lever carrying at its end a counterweight 41 in order to obtain good contact between the contact piece 38 and the resistance wire 37. Extending from the one end 46 of the resistance wire is a connecting wire to the one pole of a battery 42, the other pole of which is connected to the other end 44 of the resistance wire through an adjustable resistance 43. Inserted between this end 44 of the resistance wire and the contact piece 38 is a galvanometer 45.

When at the termination of an analysis the locking device 11, 12 of the gas analyzing apparatus liberates the sealing bell 16 and consequently also the wheel 17 the said wheel is caused by the co-action of the stop 20 on the wheel 19 with the projection 21 on the wheel 17 to assume a position corresponding to the position of the measuring bell 7, and consequently also to the result obtained in the analysis. On the rotation of the wheel 17 the position of the contact piece 38 on the resistance wire 37 and consequently also the resistance of the galvanometer circuit will be changed, causing a corresponding change of the deflection of the galvanometer. On account of the sealing bell 16 and consequently also the wheel 17 being locked immediately as soon as the pressure commences to sink, said deflection of the galvanometer is maintained until or nearly until the termination of the following analysis. By means of the adjustable resistance 43 the zero position of the galvanometer may be set or the resistance of the battery circuit may be regulated according to variations of the potential of the battery 42. By such an arrangement it is possible at any time to read off the result of the analysis, partly on a chart in the proximity of the apparatus, and partly on an indicator or indicators arranged in suitable places, for instance where it may be watched by the works superintendent, thus enabling him to control the operation at every moment.

It is evident, that the resistance wire 37 may be arranged on the wheel 19 and that the recording mechanism may be dispensed with by using an indicator.

Fig. 6 shows a gas analyzing apparatus provided with a mechanically-operated locking device according to the invention. The same references are used to designate the members shown in the preceding figures. The float 11 is connected to a bar 56 guided in an extended portion 55 of the chamber enclosing the float. The locking device comprises a lever 58 movably mounted as at 59, the one arm of said lever supporting at its end a brake member 51, while the free end 47 of the other arm may co-act with the bar 56. The brake member 51 bears normally on the wheel 17 carrying the stylus 22.

When the pump liquid has reached the level A—A and continues its ascending movement, the float will be lifted and abuts against the end 47 of the lever 58, when the liquid has reached approximately the level B—B, thus causing the brake member 51 to release the wheel 17.

This figure shows a further detail of the device according to the invention. On account of the inertia of the wheel 17 and the parts connected thereto, an additional force is necessary to overcome the static friction, when the locking device is released. Said additional force may be obtained by providing the measuring vessel 4 with an upper enlarged portion, the dimensions of which are so selected, that the movement of the liquid from the level B—B to the level C—C corresponding to the termination of the analysis corresponds to a quantity of gas that is necessary to compensate for the inertia of the stylus wheel 17.

As mentioned hereinbefore, it is of great importance, that the locking device relocks the movement of the stylus wheel before the measuring bell begins to sink. This object is attained by providing the floating means, not in the ascending pipe 2, but in a branch pipe 49 which opens into the pipe 6 at such a level, that said mouth will be opened, before the mouth of the pipe 6 in the pipe 2 is opened, that is to say, before the measuring bell can sink. Said branch pipe 49 should be U-shaped to prevent the gas from the measuring bell, on the sinking of said bell, from escaping through the chamber enclosing the float. By this arrangement the brake member must necessarily have locked the stylus wheel before the measuring bell wheel is released.

Fig. 7 shows a modification of the embodiment shown in Fig. 6, the conduit 49 not opening into the pipe 6 but into the ascending pipe 2, at such a level, in this case, too, that the mouth of the pipe 49 lies higher than that of the pipe 6. In the embodiment shown in this figure the additional or compensating gas volume is not obtained from the measuring vessel 4 nor from the conduit connecting said vessel with the absorbing vessel, but from another pipe, the pipe 6 in this case being provided with an enlarged portion 48.

In the apparatuses shown in Figs. 6 and 7 the locking device is released toward the termination of the analysis, that is to say before the whole quantity of gas has passed through the absorbing vessel. By this arrangement the apparatus will be more sensitive and the records or the deflections will be very exact. In an apparatus, where the variations of the proportions of the gas to be analyzed are small and consequently the records or the deflections are nearly constant, said additional or compensating gas volume may be disregarded and the locking device releases the stylus at the moment the analysis is terminated.

In Fig. 8 a gas analyzing apparatus is shown provided with a mechanically-operating locking device as described above, said device being influenced by a piston 52 controlled by a spring or in any suitable manner, said piston working in a cylinder 60 and being provided with a piston rod 61, which is extended upwards so far that the rod will abut against the lever 58 at or near the termination of the analysis, thus causing the release of the locking device. The piston 52 is controlled through the pipe 53 by the pressure of the apparatus. The mode of operation of this apparatus is self-evident.

What I claim as new and desire to secure by Letters Patent of the United States of America is:—

1. In a discontinuously operating gas analyzing apparatus, an indicating mechanism comprising a movable indicating member, a valve for controlling the movement of said member, a float connected to said valve, means for opening the valve in the one extreme position of the float to release said indicating member and means for closing the valve in the other extreme position of the float to lock said indicating member.

2. In a discontinuously operating gas analyzing apparatus, an indicating mechanism comprising a movable indicating member, an air bell for controlling the movement of said member, a valve for operating said air bell, a float connected to said valve, means for operating the valve in the one extreme position of the float to release said air bell and means closing the valve in the other extreme position of the float to lock said air bell.

3. In a discontinuously operating gas analyzing apparatus, an indicating mechanism comprising an indicating electrical instrument, a movable air bell, a valve for operating said air bell, electrical means controlled by said air bell for operating said electrical instrument, means for opening said valve to release said air bell and means for closing the valve to lock said air bell.

4. In a discontinuously operating gas analyzing apparatus, an indicating mechanism comprising an indicating electrical instrument placed at a distance from the apparatus proper, a movable air bell, a valve for operating said air bell, electrical means controlled by said air bell for operating said electrical instrument, means for opening said valve to release said air bell and means for closing the valve to lock said air bell.

5. In a discontinuously operating gas analyzing apparatus, an ascending pipe, means for causing a body of liquid to rise and sink alternately in said pipe in synchronism with the analyzing course, an indicating mechanism comprising a movable indicating member, a valve for controlling the movement of said member, a float in said ascending pipe and connected to said valve, means for opening the valve in the one extreme position of the float to release said indicating member and means for closing the valve in the other extreme position of the float to lock said indicating member.

6. In a discontinuously operating gas analyzing apparatus, an ascending pipe, means for causing a body of liquid to rise and sink alternately in said pipe in synchronism with the analyzing course, an indicating mechanism comprising a movable indicating member, a valve for controlling the movement of said member, said valve consisting of a liquid seal provided with a movable part, a float controlling the operation of the movable part, means for opening the liquid seal in the one extreme position of the float to release said indicating member and means for closing the liquid seal in the other extreme position of the float to lock said indicating member.

7. In a discontinuously operating gas analyzing apparatus, an ascending pipe, means for causing a body of liquid to rise and sink alternately in said pipe in synchronism with the analyzing course, an indicating mechanism comprising a movable indicating member, a valve for controlling the movement of said member, said valve consisting of a basin partly filled with sealing liquid, a pipe passing through said liquid and ending at a level above the surface of the liquid, a bell turned over the mouth of the first-mentioned pipe and an over-flow pipe communicating with the ascending pipe, a float in said ascending pipe and rigidly connected to the bell, means for operating the float in the one extreme position to lift said bell out of the sealing liquid in the basin in order to release said indicating member and means for operating the float in the other extreme position to dip said bell into the sealing liquid in the basin in order to lock said indicating member.

8. In a discontinuously operating gas analyzing apparatus, an indicating mechanism comprising a movable indicating member, a valve for controlling the movements of said member, means for operating said valve to lock said member, means for operating said valve to release said member, and means controlling said releasing means to cause said member to be released before all gas to be analyzed has passed through the apparatus.

9. In a discontinuously operating gas analyzing apparatus, a primary measuring vessel, an absorbing vessel, a pipe connecting said vessels, an indicating mechanism comprising a movable indicating member, a valve for controlling the movements of said member, means for operating said valve to lock said member, means for operating said valve to release said member and means controlling said releasing means to cause said member to be released before all gas to be analyzed has passed through the apparatus, said controlling means comprising an enlarged portion of the pipe connecting the primary measuring vessel with the absorbing vessel, said enlarged portion being situated immediately above said measuring vessel.

In testimony whereof I affix my signature.

OLOF RODHE.